United States Patent
Uekusa et al.

(10) Patent No.: US 12,554,252 B2
(45) Date of Patent: Feb. 17, 2026

(54) DECISION SYSTEM, DECISION METHOD, AND NON-TRANSITORY STORAGE MEDIUM

(71) Applicant: Panasonic Intellectual Property Management Co., Ltd., Osaka (JP)

(72) Inventors: Koji Uekusa, Chiba (JP); Mutsuhiro Yamanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 307 days.

(21) Appl. No.: 18/187,368

(22) Filed: Mar. 21, 2023

(65) Prior Publication Data

US 2023/0315058 A1   Oct. 5, 2023

(30) Foreign Application Priority Data

Mar. 30, 2022   (JP) .................................. 2022-057420

(51) Int. Cl.
  *G05B 19/00* (2006.01)
  *G05B 19/418* (2006.01)
  *G06T 7/00* (2017.01)

(52) U.S. Cl.
  CPC .......... *G05B 19/4183* (2013.01); *G06T 7/001* (2013.01); *G05B 2219/45127* (2013.01)

(58) Field of Classification Search
  None
  See application file for complete search history.

(56) References Cited

U.S. PATENT DOCUMENTS

| 2019/0195724 A1* | 6/2019 | Jo .............................. G01J 5/07 |
| 2019/0294138 A1 | 9/2019 | Dobashi et al. |
| 2022/0019944 A1* | 1/2022 | Quinton ................ G06T 19/006 |
| 2022/0221834 A1 | 7/2022 | Dobashi et al. |

FOREIGN PATENT DOCUMENTS

| CN | 112518679 A | 3/2021 |
| JP | 2018-108633 A | 7/2018 |

OTHER PUBLICATIONS

Chinese Office Action dated Nov. 26, 2025 issued in the corresponding Chinese Patent Application No. 202310253947.2, with English translation.

* cited by examiner

*Primary Examiner* — Paul B Yanchus, III
(74) *Attorney, Agent, or Firm* — Rimon P.C.

(57) ABSTRACT

A decision system includes an identifier and a decider. The identifier identifies, based on a captured image generated by an image capturing unit attached to a tool, a work target shot as a subject of the captured image as one of a plurality of work targets. The decider decides whether a first work target included in the plurality of work targets is a mistakable work target by comparing, by reference to at least one reference image, the first work target with a second work target also included in the work targets. If the second work target is similar to the first work target, the second work target makes the first work target the mistakable work target difficult to identify based on the captured image. The at least one reference image belongs to a plurality of reference images corresponding one to one to the plurality of work targets.

11 Claims, 8 Drawing Sheets

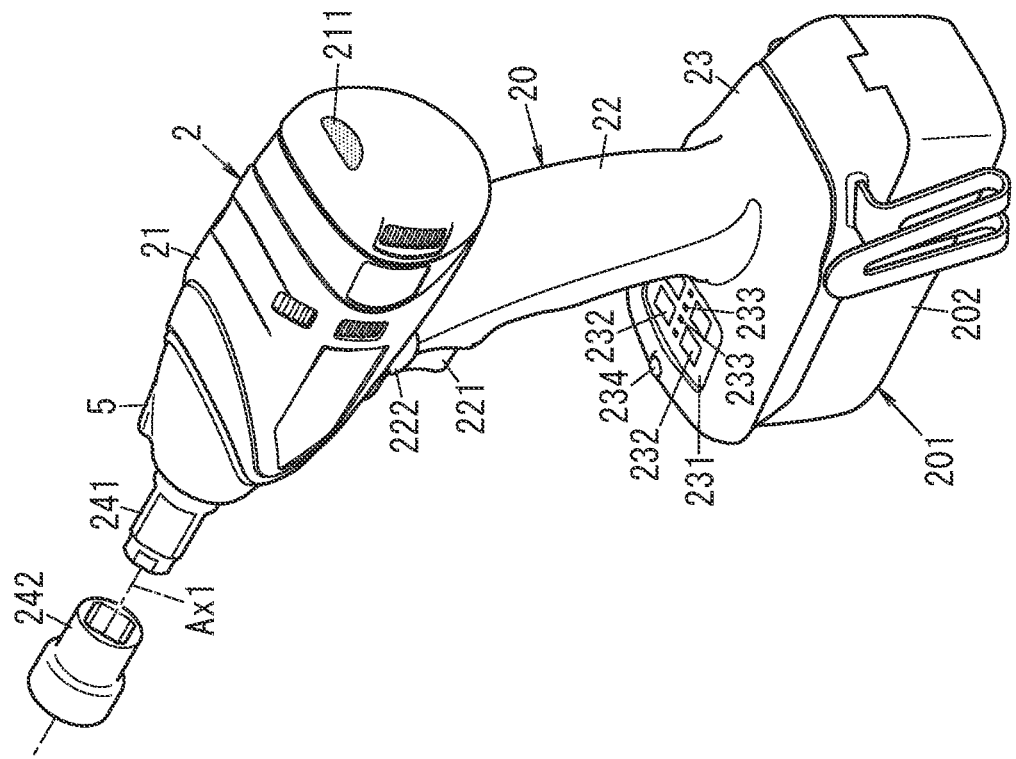
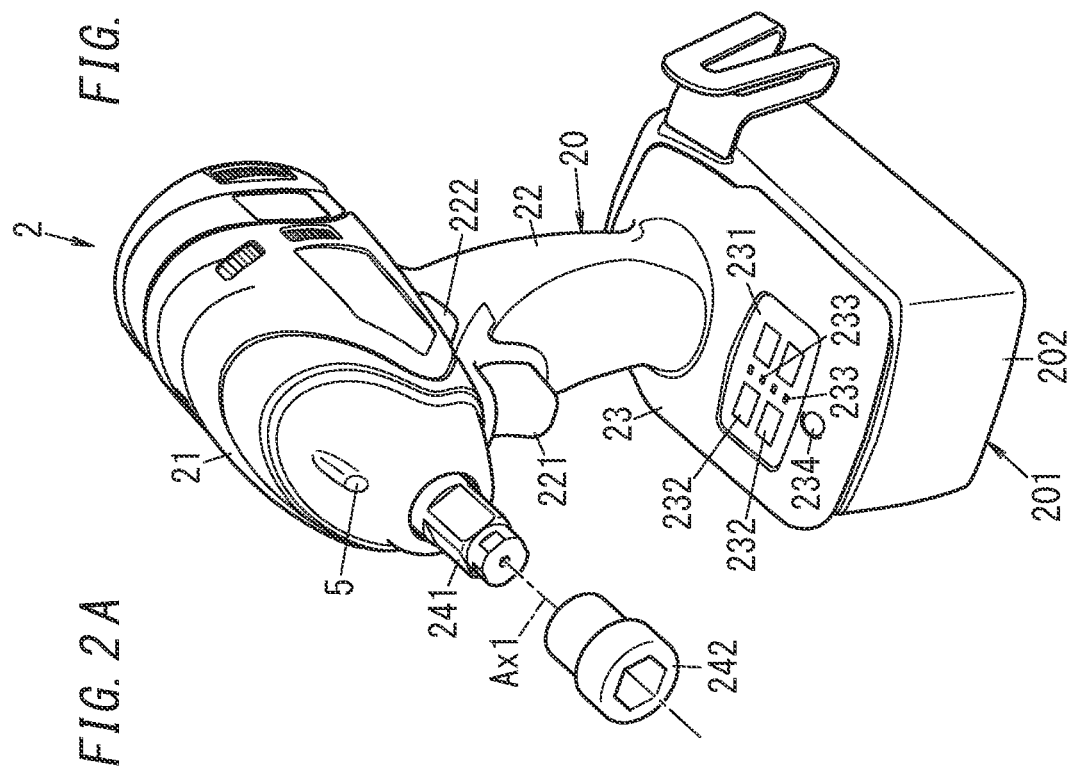

DECISION SYSTEM, DECISION METHOD, AND NON-TRANSITORY STORAGE MEDIUM

CROSS-REFERENCE TO RELATED APPLICATIONS

The present application is based upon, and claims the benefit of priority to, Japanese Patent Application No. 2022-057420, filed on Mar. 30, 2022, the entire contents of which are hereby incorporated by reference.

TECHNICAL FIELD

The present disclosure generally relates to a decision system, a decision method, and a non-transitory storage medium. More particularly, the present disclosure relates to a decision system, a decision method, and a non-transitory storage medium, all of which are configured or designed to identify a work target shot as a subject of a captured image.

BACKGROUND ART

JP 2018-108633 A discloses a tool system including a portable tool having a driving unit to be activated with power supplied from a battery pack and an image capturing unit. The image capturing unit is arranged to cover, for example, a socket, attached to an output shaft of the tool, within its image capturing range. The image capturing unit captures an image of a work target (which may be, for example, an object or a place on which work is conducted using the tool) while the work is conducted using the tool.

According to JP 2018-108633 A, the captured image generated by the image capturing unit is used to identify a work target on which the tool is currently set in place (hereinafter referred to as a "current work target"). The tool system of JP 2018-108633 A includes an identification unit. The identification unit compares the captured image generated by the image capturing unit with a plurality of reference images stored in an image storage unit and thereby identifies the current work target.

SUMMARY

If a work target needs to be identified using a captured image, some work target may be difficult to identify according to its shape, location, or any other parameter thereof. Recognizing, in advance, such a work target that would be difficult to identify would reduce the chances of making mistakes during the work.

The present disclosure provides a decision system, a decision method, and a non-transitory storage medium, all of which are configured or designed to recognize, in advance, such a work target that would be difficult to identify.

A decision system according to an aspect of the present disclosure includes an identifier and a decider. The identifier identifies, by performing identification processing based on a captured image, a work target shot as a subject of the captured image as one of a plurality of work targets. The captured image is generated by an image capturing unit attached to a tool. The decider decides, through decision processing, whether a first work target is a mistakable work target by comparing, by reference to at least one reference image, the first work target with a second work target. The first work target and the second work target are both included in the plurality of work targets. The second work target is either similar or unsimilar to the first work target. The second work target similar to the first work target makes the first work target the mistakable work target that is difficult to identify based on the captured image. The at least one reference image belongs to a plurality of reference images corresponding one to one to the plurality of work targets.

A decision method according to another aspect of the present disclosure includes an identification step and a decision step. The identification step includes identifying, based on a captured image, a work target shot as a subject of the captured image as one of a plurality of work targets. The captured image is generated by an image capturing unit attached to a tool. The decision step includes deciding whether a first work target is a mistakable work target by comparing, by reference to at least one reference image, the first work target with a second work target. The first work target and the second work target are both included in the plurality of work targets. The second work target is either similar or unsimilar to the first work target. The second work target similar to the first work target makes the first work target the mistakable work target that is difficult to identify in the identification step. The at least one reference image belongs to a plurality of reference images corresponding one to one to the plurality of work targets.

A non-transitory storage medium according to still another aspect of the present disclosure stores thereon a program designed to cause one or more processors to perform the decision method described above.

BRIEF DESCRIPTION OF DRAWINGS

The figures depict one or more implementations in accordance with the present teaching, by way of example only, not by way of limitations. In the figures, like reference numerals refer to the same or similar elements.

FIG. 2A is a perspective view illustrating the appearance, as viewed from one angle, of the tool;

FIG. 2B is a perspective view illustrating the appearance, as viewed from another angle, of the tool;

DETAILED DESCRIPTION

Figure 1:
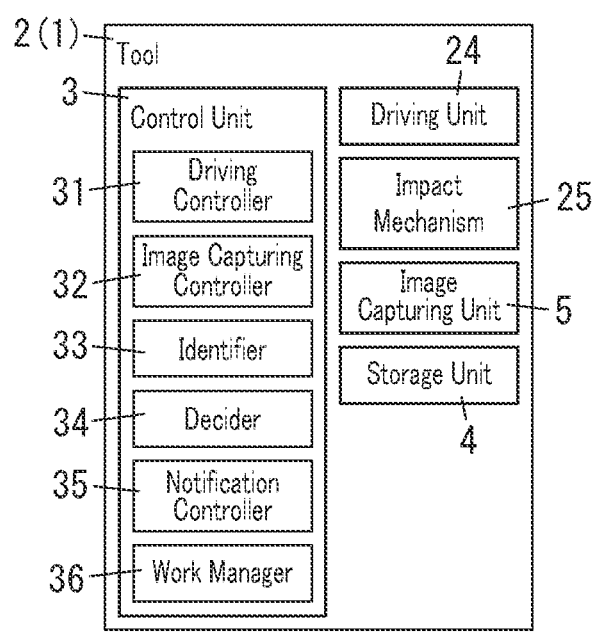
FIG. 1 is a block diagram illustrating a configuration for a decision system (tool) according to a first embodiment.

A preferred embodiment of the present disclosure will now be described in detail with reference to the accompanying drawings. In the following description of embodiments, any pair of constituent elements, having the same function, will be designated by the same reference numeral and description thereof will be omitted herein to avoid redundancy. Note that the embodiments to be described below are only exemplary ones of various embodiments of the present disclosure and should not be construed as limiting. Rather, the exemplary embodiments may be readily modified in various manners depending on a design choice or any other factor without departing from the scope of the present disclosure. The drawings to be referred to in the following description of embodiments are all schematic representations. Thus, the ratio of the dimensions (including thicknesses) of respective constituent elements illustrated on the drawings does not always reflect their actual dimensional ratio.

In the following description of embodiments, if one of two values (such as measurement data) being compared with each other is "equal to or less than" the other, this phrase may herein cover both a situation where these two values are equal to each other and a situation where one of the two values is less than the other. However, this should not be construed as limiting. Alternatively, the phrase "equal to or less than" may also be a synonym of the phrase "less than" that covers only a situation where one of the two values is under the other. That is to say, it is arbitrarily changeable, depending on selection of a threshold value or any preset value, whether the phrase "equal to or less than" covers the situation where the two values are equal to each other. Therefore, from a technical point of view, there is no difference between the phrase "equal to or less than" and the phrase "less than." Similarly, the phrase "equal to or greater than" may be a synonym of the phrase "greater than" as well.

First Embodiment (1) Overview

First, an overview of a decision system 1 (tool 2) according to a first embodiment will be described with reference to FIG. 1. The tool 2 is an example of the decision system 1.

The tool 2 according to the first embodiment may be used, for example, in an assembly line for performing assembling work on workpieces at a factory. In the first embodiment, the tool 2 is supposed to be a fastening tool such as an impact wrench for use to tighten a fastening member (such as a bolt or a nut). Specifically, the first embodiment is supposed to be applied to a situation where a single workpiece (target of machining work) has a plurality of work targets, thus requiring the user (worker) to attach a fastening member onto each of those work targets by using a tool 2 in a single working space.

As shown in FIG. 1, the tool 2 includes an identifier 33 and a decider 34.

The identifier 33 performs identification processing. The identification processing is processing of identifying, based on a captured image generated by an image capturing unit 5 attached to the tool 2, a work target shot as a subject of the captured image (hereinafter referred to as a "current work target") as one of a plurality of work targets.

The decider 34 performs decision processing. The decision processing is processing of deciding whether a first work target is a mistakable work target by comparing, by reference to at least one reference image, the first work target with a second work target. The first work target and the second work target are both included in the plurality of work targets. The second work target is either similar or unsimilar to the first work target. The second work target similar to the first work target makes the first work target the mistakable work target that is difficult to identify based on the captured image. The at least one reference image belongs to a plurality of reference images corresponding one to one to the plurality of work targets.

In the tool 2 (decision system 1) according to the first embodiment, the decider 34 determines whether a plurality of work targets includes any other similar work target (second work target) similar to a particular work target (first work target) included in the plurality of work targets. If the plurality of work targets includes any other similar work target, the chances of the identifier 33 identifying, by mistake, the particular work target as the similar work target increase compared to a situation where the plurality of work targets includes no other similar work targets. That is to say, the identification processing to be performed in a situation where the plurality of work targets includes any other similar work target is more difficult than the identification processing to be performed in a situation where the plurality of work targets includes no other similar work targets. The decider 34 according to the first embodiment may decide, in advance, whether it is difficult to identify the work target based on the captured image generated by the image capturing unit 5, thus allowing the user to recognize such a work target that would be difficult to identify (hereinafter referred to as a "mistakable work target"). Then, the user may take a countermeasure such as marking with respect to such a mistakable work target that would be difficult to identify based on the captured image.

(2) Detailed Configuration

Next, a detailed configuration for the tool 2 (decision system 1) according to the first embodiment will be described with reference to FIGS. 1-3.

As shown in FIG. 1, the tool 2 includes a control unit 3, a storage unit 4, the image capturing unit 5, a driving unit 24, and an impact mechanism 25.

As shown in FIGS. 2A and 2B, the tool 2 further includes a body 20. The driving unit 24 and the impact mechanism 25 are housed in the body 20.

The body 20 of the tool 2 includes a barrel 21, a grip 22, and an attachment 23. The barrel 21 is formed in a cylindrical shape (e.g., circular cylindrical shape in this embodiment). The grip 22 protrudes along a normal to a part of the circumferential surface of the barrel 21 (i.e., along the radius of the barrel 21). To the attachment 23, the battery pack 201 is attached removably. The attachment 23 is provided at the tip of the grip 22. In other words, the barrel 21 and the attachment 23 are coupled together via the grip 22.

At least the driving unit 24 (refer to FIG. 1) is housed in the barrel 21. The driving unit 24 includes a motor. The driving unit 24 is configured to be activated with the power supplied from the battery pack 201 to the motor. An output shaft 241 protrudes from one axial end surface of the barrel 21. The output shaft 241 turns around a rotational axis Ax1, which is aligned with the direction in which the output shaft 241 protrudes, as the driving unit 24 is activated. That is to say, the driving unit 24 drives the output shaft 241 in rotation around the rotational axis Ax1. In other words, as the driving unit 24 is activated, torque is applied to the output shaft 241, thereby causing the output shaft 241 to turn.

A cylindrical socket 242 for rotating a fastening member is attached removably onto the output shaft 241. The socket 242 turns along with the output shaft 241 around the rotational axis Ax1. The size of the socket 242 attached to the output shaft 241 may be selected as appropriate by the user according to the size of the fastening member. According to such a configuration, activating the driving unit 24 causes the output shaft 241 to turn, thus causing the socket 242 to rotate along with the output shaft 241. If the socket 242 is fitted onto a fastening member at this time, then the fastening member turns along with the socket 242, thus having the work of tightening or loosening the fastening member done. In this manner, the tool 2 may have the work of tightening or loosening the fastening member done by activating the driving unit 24.

Optionally, a socket anvil may also be attached, instead of the socket 242, onto the output shaft 241. The socket anvil is also attached removably to the output shaft 241. This allows a bit (such as a screwdriver bit or a drill bit) to be attached to the output shaft 241 via the socket anvil.

The impact mechanism 25 (refer to FIG. 1) is configured to, when (the work value of) fastening torque exceeds a predetermined level, apply impacting force in the rotational direction to the output shaft 241. This allows the tool 2 to apply greater fastening torque to the fastening member.

The barrel 21 is provided with a notification unit 211. The notification unit 211 may be implemented as, for example, a light-emitting diode (LED). The notification unit 211 is provided at the other end, opposite from the output shaft 241, of the barrel 21 to allow the user to view the notification unit 211 easily during the work.

The grip 22 is a portion to be gripped by the user while he or she is performing the work. The grip 22 is provided with a trigger switch 221 and a forward/reverse switch 222. The trigger switch 221 is a switch for controlling the ON/OFF states of the operation performed by the driving unit 24 and allows adjusting the number of revolutions of the output shaft 241 according to how deep the trigger switch 221 is pulled. The forward/reverse switch 222 is a switch for changing the rotational direction of the output shaft 241 from the clockwise direction to the counterclockwise direction, and vice versa.

The attachment 23 is formed in the shape of a compressed rectangular parallelepiped. The battery pack 201 is attached removably to one side, opposite from the grip 22, of the attachment 23.

The battery pack 201 includes a case 202 made of a resin and formed in a rectangular parallelepiped shape. The case 202 houses a rechargeable battery (such as a lithium-ion battery) inside. The battery pack 201 supplies electric power to the driving unit 24 (refer to FIG. 1), the control unit 3 (refer to FIG. 1), the storage unit 4 (refer to FIG. 1), the image capturing unit 5, and other constituent members.

The attachment 23 is also provided with an operating panel 231. The operating panel 231 may include a plurality of press button switches 232 and a plurality of LEDs (light-emitting diodes) 233, for example. The operating panel 231 allows the user to enter various types of settings for, and confirm the state of, the tool 2. That is to say, by operating the press button switches 232 of the operating panel 231, the user may check the remaining capacity of the battery pack 201, for example.

The attachment 23 further includes a light-emitting unit 234. The light-emitting unit 234 includes an LED, for example. The light-emitting unit 234 emits light toward the work target while the user is performing work using the tool 2. The light-emitting unit 234 may be turned ON and OFF by operating the operating panel 231. Alternatively, the light-emitting unit 234 may also be lit automatically when the trigger switch 221 turns ON.

The control unit 3 (refer to FIG. 1), the storage unit 4 (refer to FIG. 1), and at least a part of the image capturing unit 5 are housed in the body 20 of the tool 2. In the first embodiment, at least a part of the image capturing unit 5 is housed in the barrel 21. The control unit 3 and the storage unit 4 are housed in either the grip 22 or the attachment 23.

The image capturing unit 5 is attached to the tool 2 and generates data as a captured image. The image capturing unit 5 may be a camera including an image sensor and a lens, for example. The image capturing unit 5 is provided to be oriented toward the tip of the output shaft 241 to capture an image of the work target while the user is performing the work using the tool 2.

Specifically, the image capturing unit 5 is provided in a tip portion of the barrel 21 to be oriented toward the tip of the output shaft 241 (i.e., toward the socket 242) such that the socket 242 attached to the output shaft 241 falls within the image capturing range. The optical axis of the image capturing unit 5 is arranged to be aligned with the rotational axis Ax1 of the output shaft 241. In this embodiment, the image capturing unit 5 is arranged such that the optical axis thereof is located within a predetermined distance from the rotational axis Ax1 of the output shaft 241 and that the rotational axis Ax1 and the optical axis are substantially parallel to each other. Note that the image capturing unit 5 does not have to generate the captured image such that the socket 242 attached to the output shaft 241 falls within the image capturing range thereof. Rather the image capturing unit 5 only needs to generate a captured image in which the work target is shot as the subject.

As used herein, if something is "attached to the tool," then the former may be built in (e.g., integrated inseparably with) the latter or may be just attached as an external member to the latter (e.g., removably secured with a coupler, for example), whichever is appropriate. In the first embodiment, the image capturing unit 5 is built, as an integral part of the tool 2, in the tool 2.

As used herein, the "captured image" refers to an image captured by the image capturing unit 5 and includes a still picture (still image) and a moving picture (motion picture). The "moving picture" further includes a group of still pictures captured by stop-motion shooting, for example. The captured image does not have to be output data itself provided by the image capturing unit 5. For example, the captured image may have been subjected, as needed, to data compression, conversion into another data format, cropping an image part from the image captured by the image capturing unit 5, focus adjustment, brightness adjustment, contrast adjustment, or any of various other types of image processing. In the first embodiment, the captured image is supposed to be, for example, an image generated by shooting the workpiece with the image capturing unit 5 provided for the tool 2 in a state where the tool 2 is currently set in place on the work target. In the first embodiment, the captured image is supposed to be a full-color moving picture, for example.

As used herein, the "work target" refers to an object or a working area on which work is supposed to be performed by using the tool 2. The "work target" is a part of the workpiece and refers to a working area to which a fastening member is attached and an area surrounding the working area to which the fastening member is attached. For example, if the fastening member is a bolt, then the work target includes a screw hole into which the fastening member is screwed and an area surrounding the screw hole. In the first embodiment, the workpiece has a plurality of work targets. The plurality of work targets according to the first embodiment includes a first work target and a second work target.

As used herein, the expression "the tool is currently set in place" refers to a situation where the tool 2 has been placed so as to be ready to perform work on the work target. Also, as used herein, the phrase "placed so as to be ready to perform work" refers to not only a situation where the tool 2 is already in contact with the work target but also a situation where the tool 2 is on the verge of being brought into contact with the work target. That is to say, when the tool 2 is currently set in place on the work target, the tool 2 may be already in contact with the work target or may be still out of the contact with the work target, whichever is appropriate.

The storage unit 4 may be a semiconductor memory such as a read-only memory (ROM), a random-access memory (RAM), or an electrically erasable programmable read-only memory (EEPROM). However, the storage unit 4 does not have to be a semiconductor memory but may also be a hard disk drive, for example. The storage unit 4 according to the first embodiment stores a plurality of reference images and working procedure information.

As used herein, the "plurality of reference images" refer to images corresponding to a plurality of work targets and are images in which the work targets are shot as respective subjects. The plurality of reference images includes a first reference image corresponding to the first work target and a second reference image corresponding to the second work target. In this case, a single reference image may correspond to a single work target. Alternatively, a plurality of reference images may correspond to a single work target. In the first embodiment, a plurality of reference images corresponds to a single work target. In other words, the plurality of reference images according to the first embodiment includes a plurality of first reference images and a plurality of second reference images. Each of the plurality of first reference images corresponds to the first work target. Each of the plurality of second reference images corresponds to the second work target. Note that in the following description, each of the plurality of first reference images will be hereinafter simply referred to as a "first reference image." Likewise, each of the plurality of second reference images will be hereinafter simply referred to as a "second reference image." In the first embodiment, each reference image is supposed to be a full-color still picture, for example.

As used herein, the working procedure information refers to information indicating the working procedure. As used herein, the "working procedure" means the procedure of the work to be performed using the tool 2. For example, if a series of working process steps to be performed on either a single work target or a plurality of work targets is defined to be a single working process, then the working procedure indicates the order in which the working process steps are supposed to be performed on the single work target or the plurality of work targets through the working process. More specifically, if the instruction on the work to be done on a single work target is a "working instruction," then the working procedure is information indicating either a single working instruction or a plurality of working instructions for the single working process along with the order in which the working process steps are supposed to be performed. In the first embodiment, the working procedure is supposed to define in which order the work (including a plurality of working process steps) should be performed on a plurality of work targets in a single workpiece. In addition, the working instruction also includes information indicating a torque setting (working setting) with respect to each of a plurality of work targets.

The tool 2 includes a microcomputer including a processor and a memory. The computer system performs the functions of the control unit 3 shown in FIG. 1 by making the processor execute an appropriate program. That is to say, the control unit 3 is implemented as a computer system including the processor and the memory. The program may be stored in advance in the memory. The program may also be downloaded via a telecommunications line such as the Internet or distributed after having been stored in a non-transitory storage medium such as a memory card.

As shown in FIG. 1, the control unit 3 includes a driving controller 31, an image capturing controller 32, the identifier 33, the decider 34, a notification controller 35, and a work manager 36. Note that if no operating command is entered into the trigger switch 221 or the operating panel 231 for a certain time, the control unit 3 enters a sleep mode. The control unit 3 is activated when any operating command is entered, during the sleep mode, into either the trigger switch 221 or the operating panel 231.

The driving controller 31 controls the driving unit 24. Specifically, the driving controller 31 activates the driving unit 24 to make the output shaft 241 turn at a rotational velocity determined by the press depth of the trigger switch 221 and in a rotational direction set by the forward/reverse switch 222.

The driving controller 31 also controls the driving unit 24 such that the fastening torque becomes equal to a torque setting associated with the work target identified by the identifier 33. The driving controller 31 has a torque estimating function of estimating the magnitude of the fastening torque. In the first embodiment, the driving controller 31 estimates, until the estimated value of the fastening torque reaches a seating determination level, the magnitude of the fastening torque based on the number of revolutions or any other parameter of the driving unit 24 (motor). When the estimated value of the fastening torque reaches the seating determination level, the driving controller 31 estimates the magnitude of the fastening torque based on the number of strokes by the impact mechanism 25. When finding the number of stokes by the impact mechanism 25 has reached a threshold number of times based on the torque setting, the driving controller 31 determines that the fastening torque have reached a torque setting, and stops running the driving unit 24 (i.e., the motor). This allows the tool 2 to fasten the fastening member with fastening torque that exactly matches the torque setting.

The image capturing controller 32 is a processor for controlling the image capturing unit 5 to make the image capturing unit 5 generate a captured image.

The identifier 33 performs the identification processing as described above. The identification processing is the processing of identifying, based on a captured image generated by the image capturing unit 5, a current work target shot as a subject of the captured image. The identifier 33 identifies the current work target by subjecting the captured image generated by the image capturing unit 5 to image processing (i.e., pattern recognition processing).

As used herein, the "pattern recognition processing" refers to image processing for recognizing, based on the shape of an object (subject) shot in an image, what the object is. Examples of the pattern recognition processing of this type include pattern matching processing and processing of recognizing an object shot in an image by using a learned model generated by machine learning.

The identifier 33 according to the first embodiment identifies, by performing the identification processing based on the captured image generated by the image capturing unit 5 and a plurality of reference images, the current work target shot as the subject of the captured image. The identifier 33 according to the first embodiment identifies the current work target by performing pattern matching processing. The pattern matching processing as used herein refers to the processing of using template data (i.e., the plurality of reference images) to compare the template data with a target (such as the captured image).

The identifier 33 according to the first embodiment performs procedure confirmation processing of determining whether the work target identified conforms to a place in the working process defined by the working procedure (working procedure information). That is to say, the identifier 33 determines, through the procedure confirmation processing, whether the work target identified agrees with the work target at the place in the working process as defined by the working procedure.

The decider 34 performs the decision processing as described above. The decision processing is the processing of deciding whether a particular work target (first work target) is a mistakable work target by comparing, by reference to at least one reference image, the particular work target with another work target (second work target). The particular work target and the other work target are both included in the plurality of work targets. The other work target may or may not be similar to the particular work target. If the other work target is similar to the particular work target, then the similar work target makes the particular work target the mistakable work target that would be difficult to identify based on the captured image. The at least one reference image belongs to a plurality of reference images corresponding one to one to the plurality of work targets. Note that if the decider 34 has decided that the plurality of work targets include any other work target similar to the particular work target, the decider 34 determines the particular work target to be a mistakable work target that would be difficult to identify based on the captured image.

The decider 34 according to the first embodiment determines, through the decision processing based on a first reference image and a second reference image, whether a first work target (particular work target) and a second work target (similar or unsimilar work target) are similar to each other, thereby deciding whether the plurality of work targets includes any other work target similar to the particular work target. If the plurality of work targets includes any other work target similar to the particular work target, then the decider 34 decides that the particular work target be a mistakable work target that would be difficult to identify based on the captured image. This allows the user to take a countermeasure such as marking with respect to either the particular work target or the similar work target.

Specifically, the decider 34 according to the first embodiment determines, based on a feature quantity extracted from the first reference image and a feature quantity extracted from the second reference image, whether the first work target and the second work target are similar to each other. In other words, the decider 34 according to the first embodiment determines, by performing the decision processing based on the feature quantity extracted from each of the one or more reference images, whether the plurality of work targets includes any other work target (second work target) similar to the particular work target (first work target).

More specifically, the decider 34 according to the first embodiment determines, based on a feature quantity extracted from a first reference image out of a plurality of first reference images and a feature quantity extracted from a second reference image out of a plurality of second reference images, whether the first work target and the second work target are similar to each other.

The decider 34 determines the degree of similarity (or degree of matching) between, for example, a histogram representing feature quantities (such as pixel values) extracted from the first reference images and a histogram representing feature quantities (such as pixel values) extracted from the second reference images. Note that the "pixel value" as used herein is a value indicating the brightness (or luminance) of each pixel included in an image. According to the present disclosure, the pixel value is a value falling within the range from 0 to 255. As used herein, the "histogram representing feature quantities such as pixel values" is a histogram, of which the abscissa indicates the pixel value, and the ordinate indicates the number of pixels. Also, if the degree of similarity is equal to or greater than a degree of similarity threshold value, then the decider 34 decides that the first work target and the second work target be similar to each other. If the first work target and the second work target are similar to each other, then the decider 34 decides that the plurality of work targets include another work target (the second work target) similar to a particular work target (the first work target). That is to say, if the degree of similarity is equal to or greater than the degree of similarity threshold value, the decider 34 decides that the first work target be a mistakable work target that would be difficult to identify based on the captured image.

On the other hand, if the degree of similarity is less than the degree of similarity threshold value, then the decider 34 decides that the first work target and the second work target not resemble each other. If the first work target and the second work target are unsimilar to each other, then the decider 34 decides that the plurality of work targets include no other work targets similar to a particular work target (i.e., the first work target). That is to say, if the degree of similarity is less than the degree of similarity threshold value, the decider 34 decides that the first work target not be a mistakable work target that would be difficult to identify based on the captured image at least in the relation between the first work target and the second work target.

The decider 34 according to the first embodiment determines, with respect to every possible combination of two work targets (namely, the first work target and the second work target) selected from the plurality of work targets, whether the two work targets are similar to each other.

The decider 34 determines, based on the first reference image and the second reference image, whether the first work target and the second work target are similar to each other, thereby deciding whether the plurality of work targets includes another work target (second work target) similar to the particular work target (first work target) included in the plurality of work targets.

If the decider 34 has decided, as a result of the decision processing, that the particular work target (first work target) be a mistakable work target that would be difficult to identify based on the captured image, then the decider 34 performs registration processing. The registration processing is the processing of registering (storing) correspondence information, indicating correspondence between the particular work target (first work target) and another work target (second work target) similar to the particular work target, with (or in) the storage unit 4. For example, if the first work target and the second work target are similar to each other, then the decider 34 makes the storage unit 4 store correspondence information indicating that the first work target and the second work target are similar to each other. Optionally, the correspondence information may also be stored to be included in the working procedure information.

The notification controller 35 controls the notification unit 211 provided for the tool 2. The notification controller 35 preferably lights the notification unit 211 differently in a situation where the decision made by the identifier 33 in the procedure confirmation processing is disagreement from in a situation where the decision made by identifier 33 in the procedure confirmation processing is agreement. For example, if the decision of the procedure confirmation processing is disagreement, the notification controller 35 may light the notification unit 211 in red. On the other hand, if the decision of the procedure confirmation processing is agreement, then the notification controller 35 may light the notification unit 211 in green. This allows the user to recognize, by checking the lighting state of the notification unit 211 with the eye, whether the work target conforms to the working procedure. Optionally, when the trigger switch 221 is pulled in a state where the decision of the procedure confirmation processing is disagreement, the notification controller 35 may light the notification unit 211.

The work manager 36 is configured to determine whether the fastening torque is a normal one when the fastening member is attached to the portion to be fastened. In this case, the work manager 36 preferably determines, in accordance with the working instruction defined by the working procedure (working procedure information), whether the fastening torque is a normal one. As described above, the working instruction defined by the working procedure includes information indicating a target torque value associated with the work target. This allows the work manager 36 to determine, by comparing the target torque value included in the working instruction with the fastening torque, whether the work is being performed with the fastening torque specified by the working instruction.

If the driving controller 31 has deactivated the driving unit 24 on detecting that the number of strokes by the impact mechanism 25 has reached the threshold number of times, for example, then the work manager 36 decides that the fastening torque be normal. On the other hand, if the driving controller 31 has deactivated the driving unit 24 by turning the trigger switch 221 OFF before the number of strokes by the impact mechanism 25 reaches the threshold number of times, for example, then the work manager 36 decides that the fastening torque should be insufficient (abnormal). The work manager 36 also updates the working procedure information such that the working procedure information turns into information indicating correspondence between the decision and the work target (or working procedure). Optionally, the work manager 36 may also make the storage unit 4 store work management information which is a piece of information different from the working procedure information and which indicates correspondence between the decision and the work target (or working procedure).

(3) Operation of Decision System

Next, it will be described with reference to FIG. 3 how the tool 2 (decision system 1) operates.

Figure 3:
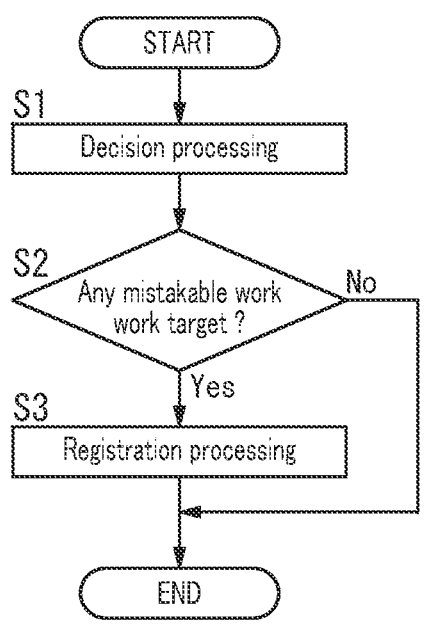
FIG. 3 is a flowchart showing the procedure of operation of the decision system.

FIG. 3 is a flowchart showing a procedure in which the tool 2 according to the first embodiment operates. The processing shown in FIG. 3 is performed after a plurality of reference images have been stored in the storage unit 4, for example. First, the decider 34 performs the decision processing (in S1). Specifically, the decider 34 decides whether a particular work target (first work target) included in the plurality of work targets is a mistakable work target that would be difficult to identify based on the captured image by determining, based at least one of a plurality of reference images, whether the plurality of work targets includes any other work target (second work target) similar to the particular work target.

Next, the decider 34 decides, as a result of the decision processing, whether there is any mistakable work target that would be difficult to identify based on the captured image (in S2). If there are no mistakable work targets that would be difficult to identify based on the captured image (if the answer is NO in S2), the decider 34 ends the processing. On the other hand, if there is any mistakable work target that would be difficult to identify based on the captured image (if the answer is YES in S2), then the decider 34 performs registration processing (in S3) and ends the processing. Specifically, the decider 34 registers correspondence information, indicating correspondence between a particular work target (first work target) and another work target (second work target) similar to the particular work target, and ends the processing.

Note that the flowchart shown in FIG. 3 shows just an exemplary operation of the decision system 1. Thus, the processing steps shown in FIG. 3 may be performed in a different order as appropriate, an additional processing step may be performed as needed, or at least one of the processing steps may be omitted as appropriate.

(4) Variations

Next, variations of the first embodiment will be enumerated one after another. Note that the variations to be described below may be adopted in combination as appropriate.

(4.1) First Variation

If the decider 34 has decided that the work target identified by the identifier 33 be a mistakable work target the would be difficult to identify, then the identifier 33 may re-identify, in accordance with the working procedure information stored in the storage unit 4, the current work target shot as a subject of the captured image.

Figure 4:
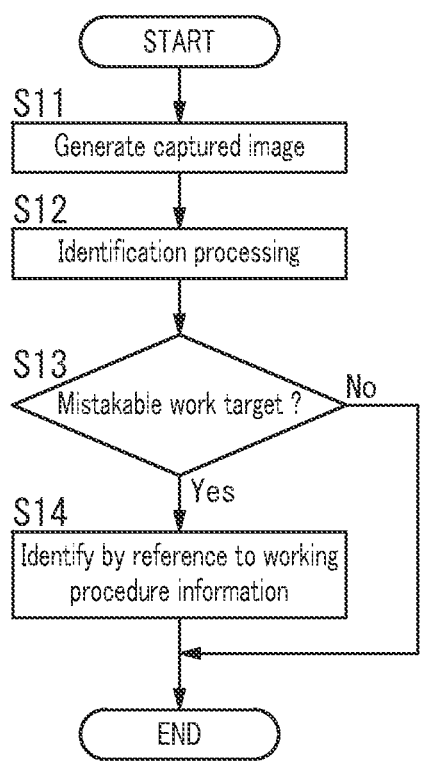
FIG. 4 is a flowchart showing the procedure of operation of a decision system according to a variation of the first embodiment.

FIG. 4 is a flowchart showing a procedure in which the tool 2 according to the first variation operates. The processing shown in FIG. 4 is performed after the tool 2 has been set in place on the work target, for example. First, the image capturing unit 5 generates a captured image (in S11).

Next, the identifier 33 performs the identification processing (in S12). Specifically, the identifier 33 identifies the current work target shot as a subject of the captured image generated by the image capturing unit 5 as any one of the plurality of work targets.

Thereafter, the identifier 33 according to the first variation determines, by reference to the correspondence information stored in the storage unit 4, whether the work target identified is a mistakable work target that would be difficult to identify based on the captured image (in S13). For example, the identifier 33 determines, by reference to the correspondence information, whether there is correspondence between the work target identified and any other work target. If there is no correspondence between the work target identified and any other work target, then the identifier 33 decides that the work target identified not be a mistakable work target that would be difficult to identify based on the captured image (i.e., the answer is NO in S13) and ends the processing.

On the other hand, if there is correspondence between the work target identified and any other work target, then the identifier 33 decides that the work target identified be a mistakable work target that would be difficult to identify based on the captured image (i.e., the answer is YES in S13). Then, the identifier 33 according to the first variation re-identifies, by reference to the working procedure information stored in the storage unit 4, the current work target shot as a subject of the captured image (in S14). Suppose, for example, the work target identified by the identifier 33 is a first work target and there is correspondence between the first work target and a second work target. If the next work target defined by the working procedure is the first work target, then the identifier 33 identifies the current work target shot as a subject of the captured image as the first work target. On the other hand, if the next work target defined by the working procedure is the second work target, then the identifier 33 identifies the current work target shot as a subject of the captured image as the second work target. The identifier 33 re-identifies, by reference to the working procedure (working procedure information), the current work target shot as a subject of the captured image (in S14) and ends the processing. Note that the processing including the processing steps S12, S13, and S14 may be regarded as the "identification processing."

The accuracy of identifying the work target (i.e., the accuracy of the identification processing) may be improved by making identifier 33 re-identify, by reference to the working procedure information stored in the storage unit 4, the current work target shot as a subject of the captured image.

Note that the flowchart shown in FIG. 4 shows just an exemplary operation of the decision system 1. Thus, the processing steps shown in FIG. 4 may be performed in a different order as appropriate, an additional processing step may be performed as needed, or at least one of the processing steps may be omitted as appropriate.

(4.2) Other Variations

The functions of the decision system 1 (tool 2) according to the first embodiment may also be implemented as a decision method, a (computer) program, or a non-transitory storage medium that stores the program thereon. A decision method according to an aspect includes an identification step and a decision step. The identification step includes identifying, based on a captured image, a current work target as one of a plurality of work targets. The captured image is generated by an image capturing unit attached to a tool. The current work target is shot as a subject of the captured image. The decision step includes deciding whether a first work target is a mistakable work target by comparing, by reference to at least one reference image, the first work target with a second work target. The first work target and the second work target are both included in the plurality of work targets. The second work target is either similar or unsimilar to the first work target. The second work target similar to the first work target makes the first work target the mistakable work target that is difficult to identify in the identification step. The at least one reference image belongs to a plurality of reference images corresponding one to one to the plurality of work targets. A program according to another aspect is designed to cause one or more processors to perform the decision method described above.

The decision system 1 (tool 2) or the agent that performs the decision method according to the present disclosure includes a computer system. The computer system may include, as principal hardware components, a processor and a memory. The functions of the decision system 1 or the agent that performs the decision method according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits such as an IC and an LSI include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Also, in the embodiment described above, the plurality of functions of the decision system 1 (tool 2) are aggregated together in a single housing (tool 2). However, this is not an essential configuration for the decision system 1. Alternatively, those constituent elements of the decision system 1 may be distributed in multiple different housings. For example, the functions of the identifier 33 and the decider 34 may also be performed by a telecommunications device provided separately from the tool 2. Still alternatively, at least some functions of the decision system 1 (e.g., some functions of tool 2) may be implemented as a cloud computing system as well. Furthermore, the plurality of reference images and the working procedure information do not have to be stored in the storage unit 4. Alternatively, the plurality of reference images and/or the working procedure information may also be stored in another storage device.

The decider 34 may decide whether the work target identified by the identifier 33 is a mistakable work target that would be difficult to identify based on the captured image by determining, after the identifier 33 has identified the current work target shot as a subject of the captured image, whether the plurality of work targets includes any other work target similar to the work target identified by the identifier 33.

The decision system 1 has only to include at least the identifier 33 and the decider 34.

In the first embodiment described above, the tool 2 is an impact wrench. However, the tool 2 does not have to be an impact wrench but may also be a nut runner or an oil pulse wrench, for example. Furthermore, the tool 2 does not have to be powered by the battery pack 201 but may also be powered by an AC power supply (commercial power supply). Moreover, the tool 2 does not have to be an electric tool but may also be an air tool including an air motor to be operated by compressed air (power) supplied from an air compressor (power source).

Note that the decision system 1 does not have to be applied to the assembly line, on which workpieces are assembled at a factory, but may find any other application as well.

Second Embodiment

In a tool 2 (decision system 1) according to a second embodiment, the identifier 33 identifies, based on the captured image and detection information acquired by a detection unit 26 provided separately from the image capturing unit 5, the current work target shot as a subject of the captured image, which is a difference from the tool 2 (decision system 1) according to the first embodiment.

Figure 5:
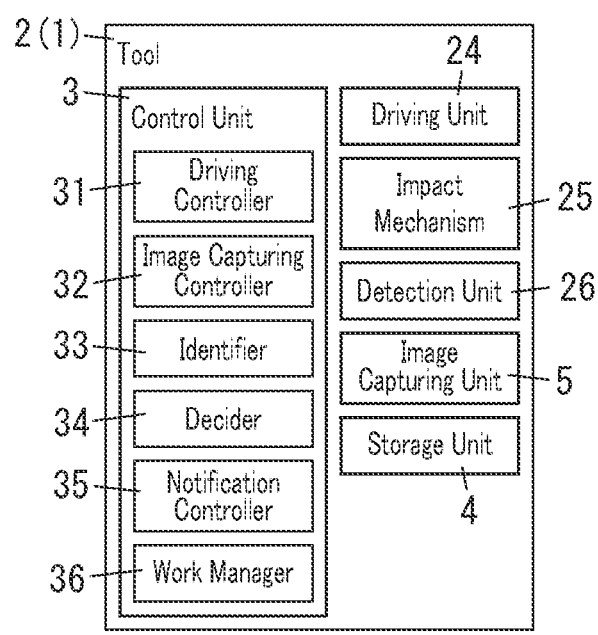
FIG. 5 is a block diagram illustrating a configuration for a decision system (tool) according to a second embodiment.

As shown in FIG. 5, the tool 2 (decision system 1) according to the second embodiment further includes the detection unit 26.

The detection unit 26 acquires detection information that allows the identifier 33 to identify a current work target shot as a subject of the captured image. The detection unit 26 may be, for example, a reader with the ability to read identification codes including a two-dimensional barcode such as a barcode and a QR code(R) and a character string or an IC tag. The detection unit 26 acquires work target information as the detection information by reading the identification code or IC tag provided on or near the work target. Note that the work target information is a piece of information indicating the name, number, or any other property corresponding to the identification code or IC tag and is a piece of information for use by the identifier 33 to identify a work target designated by the identification code or the IC tag. For example, the storage unit 4 stores information indicating the correspondence between the work targets and the work target information. In the second embodiment, the working procedure information may include such information indicating the correspondence between the work targets and the work target information.

The detection unit 26 according to the second embodiment is attached to the tool 2. More specifically, the detection unit 26 is attached to the barrel 21. The detection unit 26 is provided to point toward the tip of the output shaft 241 such that the detection unit 26 faces toward the work target while work is being performed using the tool 2. The detection unit 26 reads the identification code or IC tag provided on or near the work target and thereby acquires the work target information while the work is being performed using the tool 2.

The identifier 33 according to the second embodiment identifies, by performing the identification processing based on the detection information (work target information) acquired by the detection unit 26 provided separately from the image capturing unit 5 and the captured image, the current work target shot as a subject of the captured image.

Identifying the work target based on not only the captured image but also the detection information enables the identifier 33 to identify, based on the detection information, even a mistakable work target that would be difficult to identify based on the captured image alone. For example, providing such a mistakable work target, determined by the decider 34 to be difficult to identify based on the captured image, with an identification code or an IC tag in advance allows the identifier 33 to identify the work target accurately enough.

Next, variations of the second embodiment will be enumerated one after another. Note that the variations to be described below may be adopted in combination as appropriate.

Optionally, the detection unit 26 may be configured to acquire location information of the tool 2 as the detection information by using a positioning system such as a local positioning system (LPS) provided in an area where the tool 2 is used. For example, the detection unit 26 may be a beacon signal receiver compliant with the Bluetooth Low Energy(R) standard. The detection unit 26 may acquire location information of the work target by acquiring location information of the tool 2 while work is being performed using the tool 2. For example, the storage unit 4 may store information indicating correspondence between the work targets and the location information of the work targets. The working procedure information may include the information indicating the correspondence between the work targets and the location information of the work targets. The identifier 33 identifies, by performing the identification processing based on the captured image and the location information of the work targets (i.e., location information of the tool 2), the current work target shot as a subject of the captured image.

Alternatively, the detection unit 26 may also be configured to acquire, using the global positioning system (GPS), the location information of the tool 2 as the detection information by receiving radio waves from the GPS satellite, for example.

The detection unit 26 may be configured to acquire, as the detection information, another captured image generated by an additional image capturing unit provided separately from the image capturing unit 5. The additional image capturing unit is installed at such a position as to cover surroundings of the work target within its image capturing range. The additional image capturing unit may be mounted on, for example, the ceiling of the area where the tool 2 is used. The storage unit 4 may store, for example, information indicating correspondence between the work target and a reference image generated by the additional image capturing unit. The working procedure information may include such information indicating the correspondence between the work target and the reference image generated by the additional image capturing unit. The identifier 33 identifies, by performing the identification processing based on the captured image generated by the image capturing unit 5 and another captured image generated by the additional image capturing unit, the current work target shot as a subject of the captured image.

Third Embodiment

In a tool 2 (decision system 1) according to a third embodiment, the identifier 33 identifies, by using a learned model generated by machine learning, the current work target shot as a subject of the captured image, which is a difference from the tool 2 (decision system 1) according to the first embodiment.

The learned model has been generated by, for example, supervised learning using a plurality of supervised data items representing relation between a plurality of reference images and a plurality of work targets. In other words, the identifier 33 identifies, by performing the identification processing based on a learned model generated by reference to the relation between the plurality of reference images and the plurality of work targets, the current work target shot as a subject of the captured image. The identifier 33 receives the captured image (input image) as the input of the learned model, thereby obtaining, as the output of the learned model, identification information that identifies the current work target shot as a subject of the captured image. Note that in this third embodiment, the identification information as the output of the learned model includes information about the probability that the current work target shot as a subject of the captured image (input image) will be any particular one of the plurality of work targets. For example, the identification information may include information that the probability that the current work target shot as a subject of the captured image will be a first work target is 90%, the probability that the current work target shot as a subject of the captured image will be a second work target is 10%, and the probability that the current work target shot as a subject of the captured image will be any other work target is 0%. In the following description, the probability that the current work target shot as a subject of the input image will be a particular work target such as the first work target will be hereinafter referred to as the "probability of being a particular work target (e.g., probability of being the first work target)."

The identifier 33 according to the third embodiment refers to the identification information provided as the output of the learned model. Then, the identifier 33 identifies the current work target shot as a subject of the captured image by regarding the current work target shot as the subject of the captured image as a work target that is most likely to be designated by the identification information.

Note that the algorithm of machine learning may be, for example, a neural network. However, the machine learning algorithm does not have to be the neural network but may also be, for example, extreme gradient boosting (XGB) regression, random forest, decision tree, logistic regression, support vector machine (SVM), naive Bayes classifier, or k-nearest neighbors method. Alternatively, the machine learning algorithm may also be a Gaussian mixture model (GMM) or k-means clustering, for example. That is to say, the learning method does not have to be supervised learning but may be unsupervised learning or reinforcement learning as well.

Optionally, the learned model may be updated by performing additional learning.

Using the learned model enables the identifier 33 to identify the current work target shot as a subject of the captured image without performing, for example, pattern matching processing that uses a plurality of reference images.

The decider 34 according to the third embodiment determines, by performing the decision processing based on at least one of the plurality of reference images and information about the learned model, whether the plurality of work targets includes any other work target (second work target) similar to the particular work target (first work target).

Specifically, the decider 34 according to the third embodiment determines, in accordance with the identification information provided as the output of the learned model in a situation where at least one of the plurality of reference images is received as the input of the learned model, whether the plurality of work targets includes any other work target (second work target) similar to work target(s) (first work target) corresponding to the at least one reference image. For example, if the probability of being a second work target is higher than the probability of being a first work target in a situation where a first reference image has been received as the input of the learned model, then the decider 34 decides that the first work target and the second work target be similar to each other. On the other hand, if the probability of being a second work target and the probability of being a first work target are both less than a probability threshold value in a situation where a first reference image has been received as the input of the learned model, then the decider 34 decides that the first work target and the second work target be similar to each other. Furthermore, if the probability of being a first work target is the highest and the difference between the probability of being the first work target and the probability of being a second work target is equal to or greater than a probability threshold value, then the decider 34 decides that the first work target and the second work target be unsimilar to each other.

Determining, based on at least one reference image and information about a learned model (i.e., identification information provided as the output of the learned model), whether the plurality of work targets includes any other work target (second work target) similar to a work target (first work target) corresponding to the at least one reference image enables making a decision in advance about a mistakable work target that would be difficult to identify based on the learned model.

Next, variations of the third embodiment will be enumerated one after another. Note that the variations to be described below may be adopted in combination as appropriate.

The decider 34 may determine, in accordance with the identification information provided as the output of a learned model when a first reference image is received as the input of the learned model and the identification information provided as the output of a learned model when a second reference image is received as the input of the learned model, whether the plurality of work targets includes any other work target similar to the first work target. For example, the decider 34 determines whether there is any other work target similar to the first work target by plotting, as histograms, the probability of being the first work target in a situation where the first reference image has been received as the input of a learned model and the probability of being the first work target in a situation where the second reference image has been received as the input of a learned model. For instance, the decider 34 determines whether there is any other work target similar to the first work target by using a histogram, of which the abscissa indicates the probability of being the first work target and the ordinate indicates the number of the first reference images, and a histogram, of which the abscissa indicates the probability of being the first work target and the ordinate indicates the number of the second reference images. The decider 34 decides, when finding the degree of similarity between the histogram of the first reference images and the histogram of the second reference images equal to or greater than a predetermined value, that the plurality of work targets include another work target similar to the first work target. On the other hand, when finding the degree of similarity between the histogram of the first reference images and the histogram of the second reference images less than the predetermined value, the decider 34 decides that the plurality of work targets include no other work targets similar to the first work target. Note that if the degree of similarity between the histogram of the first reference images and the histogram of the second reference images is equal to or greater than a predetermined value, the chances that the first work target and the second work target are similar to each other are high.

Optionally, the decider 34 may determine, based on the first reference image and the second reference image and information about a distinction boundary for a learned model to distinguish the first work target and the second work target from each other, whether the first work target and the second work target are similar to each other. The "distinction boundary" may be a boundary which may be set by, for example, supervised learning that uses a plurality of first reference images and a plurality of second reference images as supervised data and is a boundary in a feature quantity space.

For example, the decider 34 may determine, based on the degree of overlap between a histogram of distances in a feature quantity space between a plurality of first reference images and the distinction boundary and a histogram of distances in the feature quantity space between a plurality of second reference images and the distinction boundary, whether the first work target and the second work target are similar to each other.

Figure 6:
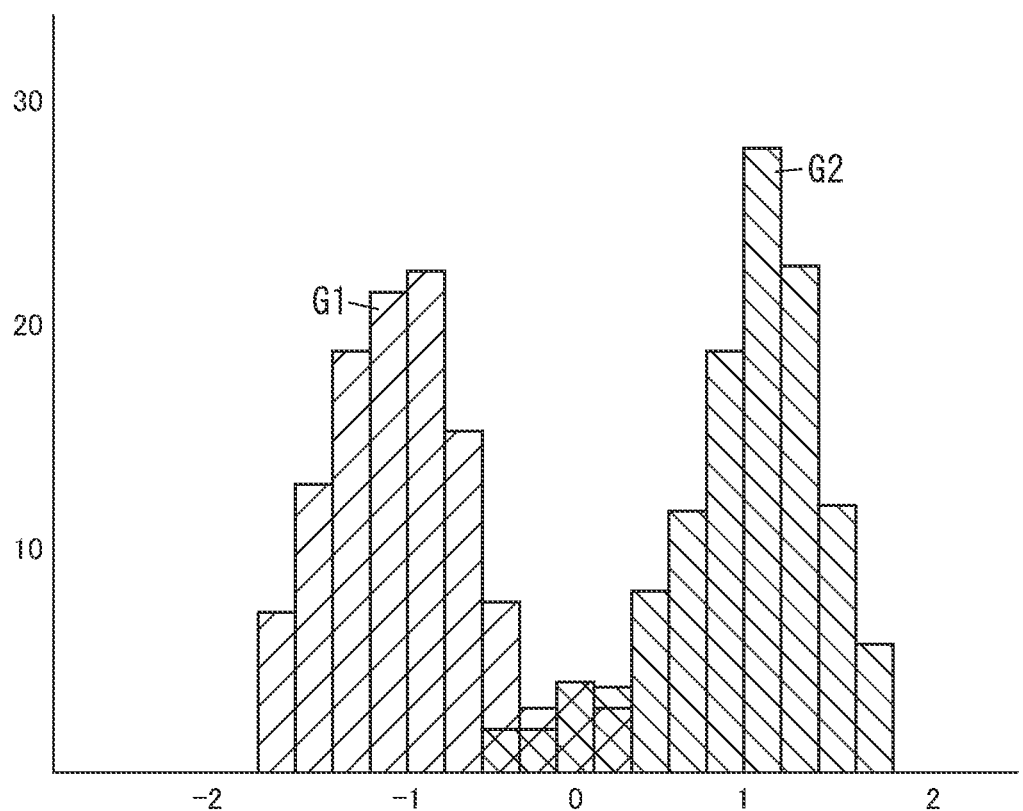
FIG. 6 is a conceptual diagram showing how identification processing is performed by a decision system according to a variation of a third embodiment.

FIG. 6 is a conceptual diagram showing a histogram of distances in the feature quantity space between a plurality of first reference images and the distinction boundary and a histogram of distances in the feature quantity space between a plurality of second reference images and the distinction boundary. In FIG. 6, a first histogram G1 is a histogram of distances in the feature quantity space between a plurality of first reference images and the distinction boundary and a second histogram G2 is a histogram of distances in the feature quantity space between a plurality of second reference images and the distinction boundary. Note that the first histogram G1 and the second histogram G2 are each a graph, of which the abscissa indicates the distances in the feature quantity space between the first reference images (or second reference images) and the distinction boundary, and the ordinate indicates the number of the first reference images (or second reference images). In FIG. 6, an overlapping portion between the first histogram G1 and the second histogram G2 is indicated by crossed hatching.

For example, the decider 34 decides, when finding the overlapping portion between the first histogram G1 and the second histogram G2 equal to or greater than an overlap threshold value, that the first work target and the second work target be similar to each other. On the other hand, when finding the overlapping portion between the first histogram G1 and the second histogram G2 less than the overlap threshold value, the decider 34 decides that the first work target and the second work target be unsimilar to each other.

Determining, based on the distances in the feature quantity space between the first reference images and the distinction boundary and the distances in the feature quantity space between the second reference images and the distinction boundary, whether the first work target and the second work target are similar to each other enables making a decision in advance about a mistakable work target that would be difficult to identify based on the learned model.

Fourth Embodiment

In a decision system 1 according to a fourth embodiment, if the work target identified by the identifier 33 is determined to be a mistakable work target that would be difficult to identify, then the notification controller 35 makes the notification unit provide information about the work target identified and information about another work target (second work target) similar to the work target identified, which is a difference from the decision system 1 according to the first embodiment. In the following description of the fourth embodiment, a situation where the decider 34 has decided that the first work target and the second work target be similar to each other will be described as an example.

Figure 7:
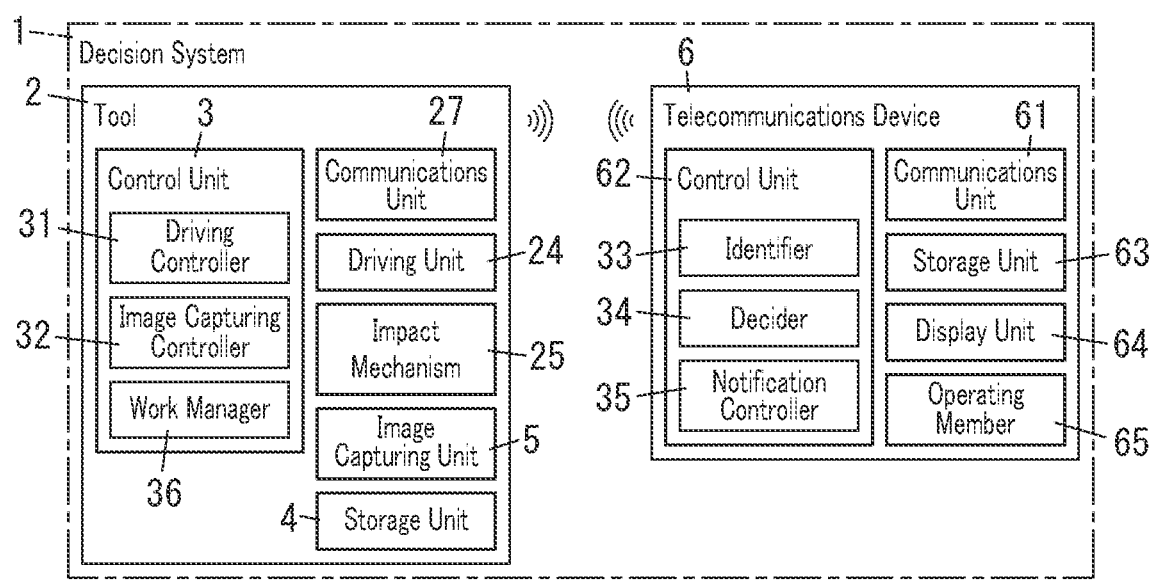
FIG. 7 is a block diagram illustrating a configuration for a decision system according to a fourth embodiment.

As shown in FIG. 7, the decision system 1 according to the fourth embodiment includes the tool 2 and a telecommunications device 6.

As shown in FIG. 7, the tool 2 according to the fourth embodiment includes a communications unit 27.

The communications unit 27 includes a communications interface configured to be ready to communicate with the telecommunications device 6. As used herein, "to be ready to communicate" means being able to transmit and receive information either directly or indirectly via a network or a relay, for example, by an appropriate wired or wireless communications protocol. The communications unit 27 according to the fourth embodiment communicates with the telecommunications device 6 by a wireless communications protocol compliant with a standard such as Wi-Fi®, Bluetooth®, ZigBee®, or a low power radio standard requiring no licenses (such as the Specified Low Power Radio standard).

The communications unit 27 transmits the captured image generated by the image capturing unit 5 to the telecommunications device 6.

Examples of the telecommunications device 6 include personal computers, smartphones, and tablet computers. The telecommunications device 6 includes a communications unit 61, a control unit 62, a storage unit 63, a display unit 64, and an operating member 65.

The telecommunications device 6 includes a microcomputer including a processor and a memory. The computer system performs the functions of the control unit 62 by making the processor execute an appropriate program. That is to say, the control unit 62 is implemented as a computer system including the processor and the memory. The program may be stored in advance in the memory. The program may also be downloaded via a telecommunications line such as the Internet or distributed after having been stored in a non-transitory storage medium such as a memory card.

The communications unit 61 includes a communications interface configured to be ready to communicate with the tool 2. The communications unit 61 according to the fourth embodiment communicates with the tool 2 by a wireless communications protocol compliant with a standard such as Wi-Fi®, Bluetooth®, ZigBee®, or a low power radio standard requiring no licenses (such as the Specified Low Power Radio standard).

The communications unit 61 receives, from the communications unit 27 of the tool 2, the captured image generated by the image capturing unit 5 attached to the tool 2.

The storage unit 63 is a semiconductor memory such as a ROM, a RAM, or an EEPROM. Note that the storage unit 63 does not have to be a semiconductor memory but may also be, for example, a hard disk drive. The storage unit 63 according to the fourth embodiment stores, for example, a plurality of reference images, the working procedure information, and the correspondence information.

The display unit 64 includes a liquid crystal display (LCD), for example. The display unit 64 according to the fourth embodiment serves as a notification unit that provides information about the identification processing performed by the identifier 33 and information about the decision processing performed by the decider 34. If a decision has been made that the work target identified by the identifier 33 be a mistakable work target that would be difficult to identify, then the display unit 64 displays information about the work target identified by the identifier 33 and information about another work target (second work target) similar to the work target identified by the identifier 33.

The operating member 65 accepts an operating command entered by a person (user) and outputs a signal in accordance with his or her operating command. In this embodiment, the telecommunications device 6 is supposed to include a touchscreen panel display in which the display unit 64 and the operating member 65 are integrated together. In the touchscreen panel display, when the operating member 65 detects that any object (such as a button) on each screen image displayed on the display unit 64 has been operated (e.g., tapped, swiped, or dragged), the telecommunications device 6 decides that the object such as the button have been operated. That is to say, the display unit 64 and the operating member 65 not only display various types of information but also serve as a user interface that accepts a person's operating commands.

The operating member 65 according to the fourth embodiment serves as a prompting unit that accepts the user's choice about the work target that would be difficult to be identified by the identifier 33. If a decision has been made that the work target identified by the identifier 33 be a mistakable work target that would be difficult to identify, then the operating member 65 prompts the user to decide whether the current work target shot as a subject of the captured image is the work target identified or any other work target (second work target) similar to the work target identified.

The control unit 62 includes the identifier 33, the decider 34, and the notification controller 35.

The notification controller 35 according to the fourth embodiment makes the display unit 64 (notification unit) display (present) information about the identification processing performed by the identifier 33. If a decision has been made that the work target identified by the identifier 33 be a mistakable work target that would be difficult to identify, the notification controller 35 makes the display unit 64 display information about the work target identified and information about another work target (second work target) similar to the work target identified.

For example, if the current work target shot as a subject of the captured image has been identified as the first work target by the identifier 33, then the notification controller 35 makes the display unit 64 display information about the first work target and information about a second work target similar to the first work target. Optionally, the notification controller 35 may make the display unit 64 display information that the identifier 33 has identified the current work target shot as a subject of the captured image as the first work target.

The notification controller 35 makes the display unit 64 display information about the first work target and information about the second work target similar to the first work target, thus allowing the user to be notified that the work target identified by the identifier 33 is a mistakable work target that would be difficult to identify.

In addition, the notification controller 35 also makes the display unit 64 display information about the work target identified and information about another work target (second work target) similar to the work target identified in such a manner as to allow the user to decide whether the current work target shot as a subject of the captured image is the work target identified or any other work target similar to the work target identified. That is to say, the notification controller 35 makes the display unit 64 (notification unit) display (present) information about multiple work targets as options, any one of which should be identified as the current work target shot as a subject of the captured image.

The operating member 65 (prompting unit) accepts, as choice information, the user's operating command entered through the display unit 64. The identifier 33 according to the fourth embodiment re-identifies, in accordance with the choice information accepted by the operating member 65, the current work target shot as a subject of the captured image.

Even if the work target chosen by the user is a mistakable work target that would be difficult to be identified by the identifier 33, making the user choose a work target from a limited number of options may still reduce the chances of the work being performed on a misidentified work target.

Figure 8:
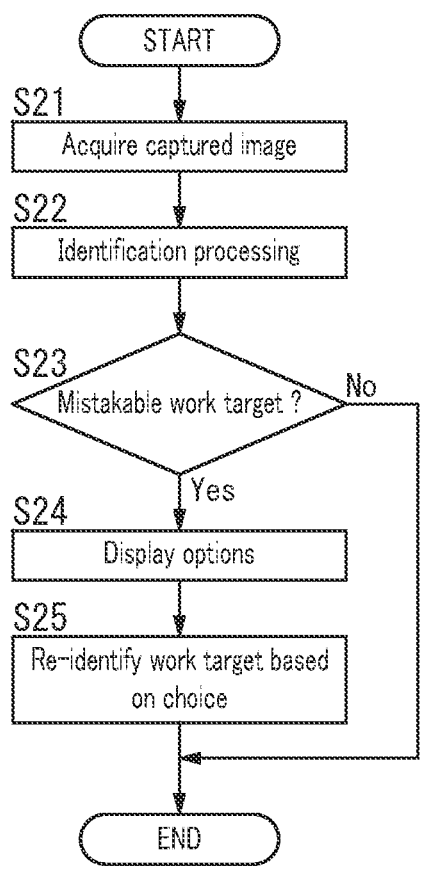
FIG. 8 is a flowchart showing the procedure of operation of the decision system.

FIG. 8 is a flowchart showing a procedure in which the decision system 1 according to the fourth embodiment operates. First, the telecommunications device 6 receives and acquires, from the tool 2, the captured image generated by the image capturing unit 5 attached to the tool 2 (in S21). Next, the identifier 33 of the telecommunications device 6 performs the identification processing (in S22).

Subsequently, the identifier 33 decides, by reference to the correspondence information, whether the work target identified is a mistakable work target that would be difficult to identify based on the captured image (in S23). If there is no correspondence between the work target identified and any other work target, then the identifier 33 decides that the work target identified not be a mistakable work target that would be difficult to identify based on the captured image (i.e., the answer is NO in S23) and ends the processing.

On the other hand, if there is correspondence between the work target identified and any other work target (second work target), then the identifier 33 decides that the work target identified be a mistakable work target that would be difficult to identify based on the captured image (i.e., the answer is YES in S23). Next, the notification controller 35 makes the display unit 64 display information about multiple work targets as options, any one of which should be the current work target shot as a subject of the captured image, to identify the work target (in S24). Then, the identifier 33 re-identifies, in accordance with the choice information accepted by the operating member 65, the current work target shot as a subject of the captured image (in S25) and ends the processing.

Next, variations of the fourth embodiment will be enumerated one after another. Note that the variations to be described below may be adopted in combination as appropriate.

The notification controller 35 may make an alternative notification unit that emits a sound (including a voice) such as loudspeaker or a buzzer provide information about multiple work targets as options, any one of which should be a current work target shot as a subject of the captured image, to identify the work target.

In the fourth embodiment, at least some functions of the decision system 1, which are distributed in multiple devices, may be aggregated together in a single housing. For example, some functions of the decision system 1, which are distributed in the tool 2 and the telecommunications device 6, may be aggregated together in a single housing. Specifically, the functions of the identifier 33, the decider 34, and the notification controller 35, which are provided for the telecommunications device 6 according to the fourth embodiment, may be provided for the tool 2 as well. Optionally, the tool 2 may include the display unit 64 and the operating member 65.

(Recapitulation)

As can be seen from the foregoing description, a decision system (1) according to a first aspect includes an identifier (33) and a decider (34). The identifier (33) identifies, by performing identification processing based on a captured image, a work target shot as a subject of the captured image as one of a plurality of work targets. The captured image is generated by an image capturing unit (5) attached to a tool (2). The decider (34) decides, through decision processing, whether a first work target is a mistakable work target by comparing, by reference to at least one reference image, the first work target with a second work target. The first work target and the second work target are both included in the plurality of work targets. The second work target is either similar or unsimilar to the first work target. The second work target similar to the first work target makes the first work target the mistakable work target that is difficult to identify based on the captured image. The at least one reference image belongs to a plurality of reference images corresponding one to one to the plurality of work targets.

This aspect enables deciding, in advance, whether it is difficult to identify a work target based on a captured image generated by the image capturing unit (5), thus allowing the user to recognize a mistakable work target that would be difficult to identify. This allows the user to take a countermeasure, such as marking, in advance with respect to such a mistakable work target that would be difficult to identify based on the captured image.

A decision system (1) according to a second aspect, which may be implemented in conjunction with the first aspect, further includes a notification controller (35). The notification controller (35) makes a notification unit (display unit 64) provide information about the identification processing. The notification controller (35) makes, when the decider (34) has decided that the work target identified by the identifier (33) be the mistakable work target, the notification unit provide information about the work target identified and information about the second work target similar to the first work target.

This aspect enables notifying the user that the work target identified by the identifier (33) is a mistakable work target that would be difficult to identify.

A decision system (1) according to a third aspect, which may be implemented in conjunction with the second aspect, further includes a prompting unit (operating member 65). The prompting unit prompts, when the decider (34) has decided that the work target identified be the mistakable work target, a user to decide whether the work target shot as the subject is the work target identified or the second work target similar to the first work target.

This aspect enables reducing the chances of, even if the work target shot as the subject is a mistakable work target difficult to be identified by the identifier (33), the work being performed on a misidentified work target by prompting the user to choose a work target from a limited number of options.

In a decision system (1) according to a fourth aspect, which may be implemented in conjunction with any one of the first to third aspects, the identifier (33) re-identifies, when the decider (34) has decided that the work target identified by the identifier (33) be the mistakable work target, the work target shot as the subject by reference to working procedure information stored in a storage unit (4).

This aspect enables improving the accuracy of identifying the work target (i.e., accuracy of the identification processing) by making the identifier (33) re-identify the work target shot as the subject by reference to the working procedure information stored in a storage unit (4).

In a decision system (1) according to a fifth aspect, which may be implemented in conjunction with any one of the first to fourth aspects, the identifier (33) identifies the work target shot as the subject by performing the identification processing based on detection information and the captured image. The detection information is acquired by a detection unit (26) independent of the image capturing unit (5).

According to this aspect, the work target is identified based on not only the captured image but also detection information as well, thereby enabling the identifier (33) to identify, based on the detection information, even a mistakable work target that would be difficult to identify based on the captured image alone. The identifier (33) may identify the work target highly accurately by providing an identification code or an IC tag, for example, in advance for the work target that has been determined by the decider (34) to be difficult to identify based on the captured image.

In a decision system (1) according to a sixth aspect, which may be implemented in conjunction with any one of the first to fifth aspects, the plurality of reference images includes a first reference image corresponding to the first work target and a second reference image corresponding to the second work target. The decider (34) decides, through the decision processing, whether the plurality of work targets includes the second work target similar to the first work target by comparing, by reference to the first reference image and the second reference image, the first work target and the second work target with each other.

This aspect enables deciding whether the plurality of work targets includes any second work target similar to the first work target by comparing, by reference to the first reference image and the second reference image, the first work target and the second work target with each other.

In a decision system (1) according to a seventh aspect, which may be implemented in conjunction with any one of the first to sixth aspects, the identifier (33) identifies the work target shot as the subject by performing the identification processing based on a learned model. The learned model has been generated by learning a relation between the plurality of reference images and the plurality of work targets.

This aspect enables the identifier (33) to identify the work target shot as the subject using a learned model without performing pattern matching processing using a plurality of reference images, for example.

In a decision system (1) according to an eighth aspect, which may be implemented in conjunction with the seventh aspect, the decider (34) decides, by performing the decision processing based on the at least one reference image and information about the learned model, whether the plurality of work targets includes the second work target similar to the first work target.

This aspect enables making a decision in advance about even a work target that would be difficult to identify based on a learned model alone by determining, using the at least one reference image and information about the learned model (i.e., information provided as the output of the learned model), whether the plurality of work targets includes any second work target similar to a work target corresponding to the at least one reference image.

In a decision system (1) according to a ninth aspect, which may be implemented in conjunction with any one of the first to eighth aspects, the decider (34) performs the decision processing in advance before the identifier (33) performs the identification processing.

According to this aspect, making the decider (34) decide, if the plurality of work targets includes any second work target similar to the first work target, that the first work target be the mistakable work target allows the user to take, in advance, a countermeasure such as marking with respect to either the first work target or the second work target similar to the first work target.

Note that the constituent elements according to the second to ninth aspects are not essential constituent elements for the decision system (1) but may be omitted as appropriate.

A decision method according to a tenth aspect includes an identification step and a decision step. The identification step includes identifying, based on a captured image, a work target shot as a subject of the captured image as one of a plurality of work targets. The captured image is generated by an image capturing unit (5) attached to a tool (2). The decision step includes deciding whether a first work target is a mistakable work target by comparing, by reference to at least one reference image, the first work target with a second work target. The first work target and the second work target are both included in the plurality of work targets. The second work target is either similar or unsimilar to the first work target. The second work target similar to the first work target makes the first work target the mistakable work target that is difficult to identify in the identification step. The at least one reference image belongs to a plurality of reference images corresponding one to one to the plurality of work targets.

This aspect enables deciding, in advance, whether it is difficult to identify a work target based on a captured image generated by the image capturing unit (5), thus allowing the user to recognize a mistakable work target that would be difficult to identify. This allows the user to take a countermeasure, such as marking, in advance with respect to such a mistakable work target that would be difficult to identify based on a captured image.

A non-transitory storage medium according to an eleventh aspect stores thereon a program designed to cause one or more processors to perform the decision method according to the tenth aspect.

This aspect enables deciding, in advance, whether it is difficult to identify a work target based on a captured image generated by the image capturing unit (5), thus allowing the user to recognize a mistakable work target that would be difficult to identify. This allows the user to take a countermeasure, such as marking, in advance with respect to such a mistakable work target that would be difficult to identify based on a captured image.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A decision system comprising:
   a tool comprising:
      a body,
      a barrel included in the body,
      a driving unit housed in the barrel,
      an output shaft protruding from the barrel and rotated by the driving unit, and
      an image capturing unit attached to the barrel, whose optical axis is substantially aligned with a rotational axis of the output shaft;
   one or more memories; and
   at least one processor coupled to at least one of the one or more memories and configured to:
   identify, by performing identification processing based on a captured image, a work target shot as a subject of the captured image as one of a plurality of work targets, the captured image being generated by the image capturing unit; and
   decide, through decision processing, whether a first work target is a mistakable work target by comparing, by reference to at least one reference image, the first work target with a second work target,
   wherein:
   the first work target and the second work target are both included in the plurality of work targets,
   the second work target is either similar or unsimilar to the first work target,
   the second work target similar to the first work target makes the first work target the mistakable work target that is difficult to identify based on the captured image, and
   the at least one reference image belongs to a plurality of reference images corresponding one to one to the plurality of work targets.

2. The decision system of claim 1, the at least one processor is further configured to;
   provide information about the identification processing, wherein when the at least one processor has decided that the work target identified by the at least one processor is the mistakable work target, and provide information about the work target identified and information about the second work target similar to the first work target.

3. The decision system of claim 2, the at least one processor is further configured to, when the at least one processor has decided that the work target identified is the mistakable work target, prompt a user to decide whether the work target shot as the subject is the work target identified or the second work target similar to the first work target.

4. The decision system of claim 1, wherein
   the at least one processor is configured to, when the at least one processor has decided that the work target identified by the at least one processor is the mistakable work target, re-identify the work target shot as the subject by reference to working procedure information stored in the one or more memories.

5. The decision system of claim 1, wherein
   the at least one processor is configured to identify the work target shot as the subject by performing the identification processing based on detection information and the captured image, the detection information being acquired by a scanner independent of the image capturing unit.

6. The decision system of claim 1, wherein
   the plurality of reference images include a first reference image corresponding to the first work target and a second reference image corresponding to the second work target, and
   the at least one processor is configured to decide, through the decision processing, whether the plurality of work targets include the second work target similar to the first work target by comparing, by reference to the first reference image and the second reference image, the first work target and the second work target with each other.

7. The decision system of claim 1, wherein
   the at least one processor is configured to identify the work target shot as the subject by performing the identification processing based on a learned model, the learned model having been generated by learning a relation between the plurality of reference images and the plurality of work targets.

8. The decision system of claim 7, wherein
   the at least one processor is configured to decide, by performing the decision processing based on the at least one reference image and information about the learned model, whether the plurality of work targets include the second work target similar to the first work target.

9. The decision system of claim 1, wherein
   the at least one processor is configured to perform the decision processing in advance before the at least one processor performs the identification processing.

10. A decision method comprising:
    an identification step including identifying, based on a captured image, a work target shot as a subject of the captured image as one of a plurality of work targets, the captured image being generated by an image capturing unit, wherein (i) the image capturing unit is attached to a barrel, which (1) houses a driving unit and (2) is included in a body of a tool, and (ii) an optical axis of the image capturing unit is substantially aligned with a rotational axis of an output shaft which is protruding from the barrel and rotated by the driving unit; and a decision step including deciding whether a first work target is a mistakable work target by comparing, by reference to at least one reference image, the first work target with a second work target, wherein:

the first work target and the second work target are both included in the plurality of work targets, the second work target is either similar or unsimilar to the first work target, the second work target similar to the first work target makes the first work target the mistakable work target that is difficult to identify in the identification step, and the at least one reference image belongs to a plurality of reference images corresponding one to one to the plurality of work targets.

11. A non-transitory storage medium storing thereon a program designed to cause one or more processors to perform the decision method of claim 10.

\* \* \* \* \*